United States Patent
Ferrari et al.

(10) Patent No.: US 8,312,804 B2
(45) Date of Patent: Nov. 20, 2012

(54) ACTUATOR UNIT COMPRISING FORCE AMPLIFICATION

(76) Inventors: Gino Ferrari, Correggio (IT); Franco Maioli, Correggio (IT)

( * ) Notice: Subject to any disclaimer, the term of this patent is extended or adjusted under 35 U.S.C. 154(b) by 909 days.

(21) Appl. No.: 12/377,857

(22) PCT Filed: Jul. 27, 2007

(86) PCT No.: PCT/IB2007/002142
§ 371 (c)(1),
(2), (4) Date: Mar. 21, 2009

(87) PCT Pub. No.: WO2008/012664
PCT Pub. Date: Jan. 31, 2008

(65) Prior Publication Data
US 2010/0243174 A1    Sep. 30, 2010

(30) Foreign Application Priority Data
Jul. 28, 2006  (IT) .............. MO2006A0244

(51) Int. Cl.
*F01B 9/00* (2006.01)
*B60B 30/06* (2006.01)
*F16H 21/44* (2006.01)

(52) U.S. Cl. ............ 92/140; 92/DIG. 4; 74/110; 157/16
(58) Field of Classification Search .................... 92/140, 92/DIG. 4; 74/110; 157/16, 1.24
See application file for complete search history.

(56) References Cited

U.S. PATENT DOCUMENTS

| 2,135,299 | A | * | 11/1938 | Benander ........................ 74/110 |
| 4,149,450 | A | * | 4/1979 | Schleicher ...................... 92/140 |
| 4,957,193 | A | | 9/1990 | Tamamori |
| 5,370,039 | A | | 12/1994 | Kirsching |

FOREIGN PATENT DOCUMENTS

DE    4215604    11/1993

* cited by examiner

*Primary Examiner* — F. Daniel Lopez
(74) *Attorney, Agent, or Firm* — Themis Law

(57) ABSTRACT

The actuator unit includes a hollow body defining a sliding chamber within; a piston mounted sliding inside said sliding chamber such to provide an actuation force and operated by a fluid fed from the outside; a body having one transmission end for the transmission of said actuation force prolonged outside said sliding chamber and one hooking end hooked to said piston, amplification means being interposed between said body and said piston to amplify said actuation force so as to obtain an amplified actuation force.

13 Claims, 4 Drawing Sheets

ACTUATOR UNIT COMPRISING FORCE AMPLIFICATION

TECHNICAL FIELD

The invention relates to an actuator unit, particularly suitable for using on tire changing machines.

TECHNOLOGICAL BACKGROUND

Fluid-dynamic actuators are used quite commonly to move apparatus in many technical sectors like, for instance, on tire changing machines used to remove and mount tires from their rims.

These fluid-dynamic actuators comprise an external casing, normally cylindrical in shape, inside which a sliding chamber is obtained; inside this chamber a coaxial piston is mounted sliding which is operated by a fluid that is let into the sliding chamber and which makes the piston move in one direction or the other, pushing against its cross surface.

To the piston is associated at least one rod which extends outside the sliding chamber and which is designed to be hooked to an apparatus that must be operated by the actuator or that can be fixed to an unmoving point of a structure so that it is the casing that moves due to the reaction of the thrust of the fluid on the piston and that makes an apparatus hooked to it move.

The fluid normally used is pressurized air or oil. The force developed by the piston and which is transmitted to the rod, or, due to the reaction, to the casing, is determined, as is common knowledge, by the pressure exerted by the fluid and by the overall area of the piston on which said pressure acts.

Therefore, to be able to have strong forces available the surface of the pistons must be extensive and, therefore, the actuators must be proportionally large in size in relation to the forces one wishes to obtain.

This state of the art has a drawback which is the impossibility of obtaining high forces when, for example, for reasons of space the size must be compact, only small fluid-dynamic actuators can be used which as a result are only capable of providing forces of a limited extent with respect to the usages for which the fluid-dynamic actuators must be employed.

This drawback occurs, for example, in tire changing machines where all the actuating bodies of the various machine functions are located inside a box frame which forms its base.

In detail, this drawback concerns above all the actuator unit that operates the locking bodies used to block a wheel on the working platform that these tire changing machines are equipped with.

These locking bodies comprise a resting element whose resting surface can be substantially horizontal or even vertical and against which a wheel is placed on which either maintenance or repair jobs are to be done.

A shaft extends centrally from this resting element, going through it axially and extending beyond it.

The centre hole of the wheel rim is inserted on one free end of this shaft, facing outwards.

This shaft is connected to a fluid-dynamic actuator unit located inside the base of the tire changing machine or it is the rod itself that extends from the piston of the latter and moves with a reciprocating motion either from or to the resting element.

The end of the shaft facing outwards is threaded and on this a conical body can be screwed which, after a wheel has been placed against the resting element having made the shaft pass through its centre hole, is screwed down by hand until it engages in this centre hole, adapting to it automatically thanks to its conical shape, until it rests against the edges of it.

In this phase the shaft is in a maximum upwards or outwards sliding position and, when the conical body is well positioned, the actuator unit is activated, exerting a traction force on the shaft to pull it along the direction of the resting element, thus locking the rim on it and, therefore, the wheel with the conical body.

The fact is though that the fluid-dynamic actuator unit, which can be housed in the base of the tire changing machine, must be small in size due to the small size of the base itself and of the numerous other devices the base houses. Therefore, this actuator unit is able to exert a limited force on the rims of the wheels even if these wheels are big and heavy like, for instance, those of transport vehicles, work site vehicles or agricultural vehicles.

OBJECTS OF THE INVENTION

The technical aim of the invention is to improve the state of the art.

One object of the invention is to make an actuator unit that is able to produce high absolute value forces even if, in relation to these forces, the actuator unit itself is quite small.

Another object of the invention is to make an actuator unit that can be mounted on new tire changing machines or on machines already in use, replacing the wheel locking devices used up until then.

According to one aspect of the invention, an actuator unit is provided comprising: a hollow body that defines a sliding chamber inside; a piston mounted sliding inside said sliding chamber in such a way as to provide an actuation force outside it, operated by a fluid fed from outside; a body having one transmission end for the transmission of said actuation force prolonged outside said sliding chamber and one hooking end hooked to said piston, characterized by the fact that amplification means are interposed between said prolonged body and said piston means to amplify said actuation force so as to obtain an amplified actuation force.

The actuator unit permits therefore obtaining high absolute value forces even if the overall dimensions of the actuator unit itself are quite small.

Consequently, especially in the tire changing machine sector, it is possible to lock with adequate force the rims of wheels on the resting apparatus with which these tire changing machines are equipped and without having to use rotating platforms that are very big and adequate locking apparatus that slide along these platforms to lock the edges of the wheels rims on which tires have to be removed or mounted.

BRIEF DESCRIPTION OF THE DRAWINGS

Further characteristics and advantages will appear even more evident from the description of an embodiment of an actuator unit, illustrated in a purely exemplary and not limitative form, in the attached drawings wherein.

EMBODIMENTS OF THE INVENTION

Figure 1:
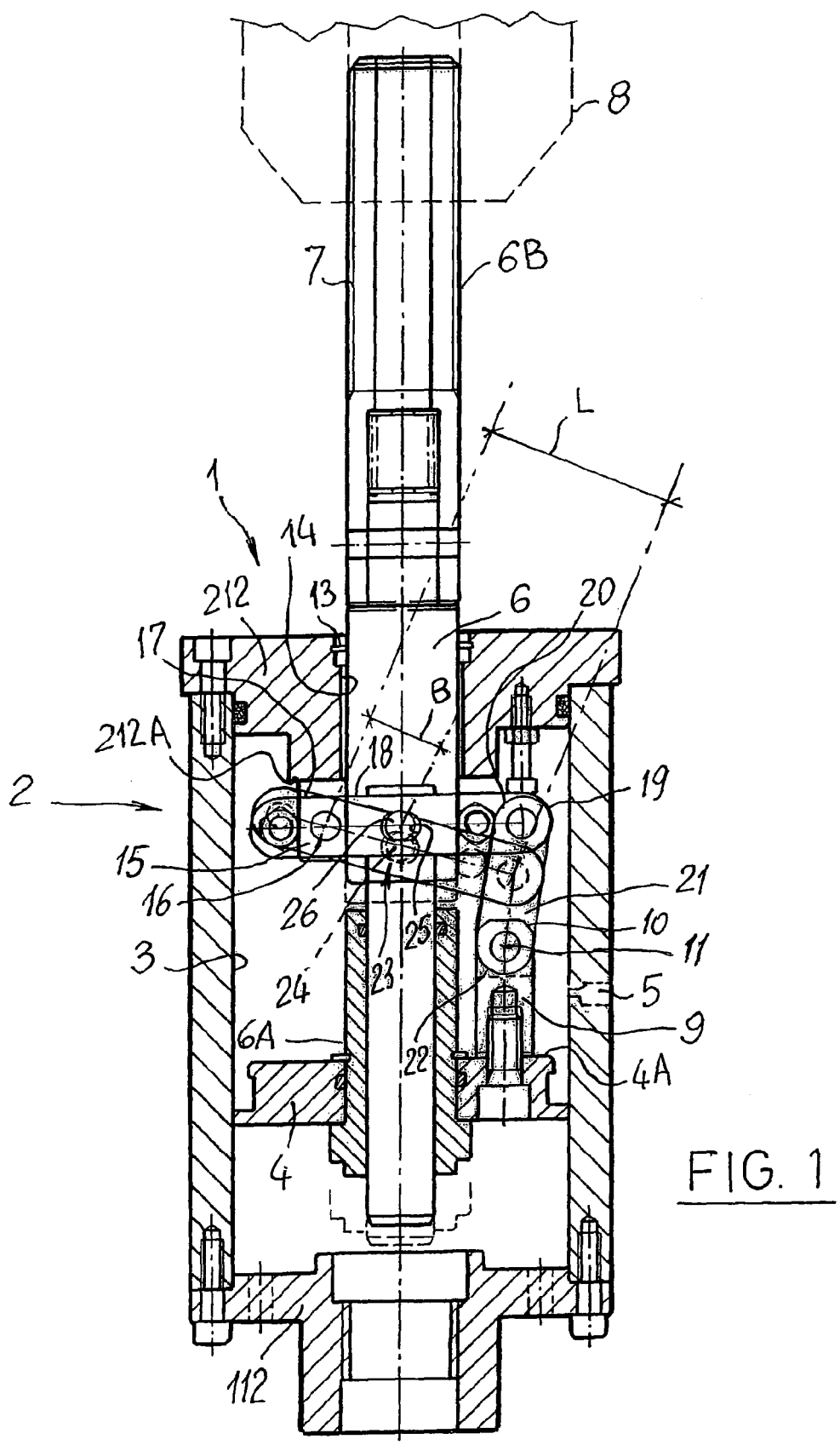
FIG. 1 is a transparent schematic view of an actuator unit equipped with actuation force amplification means.
Figure 2:
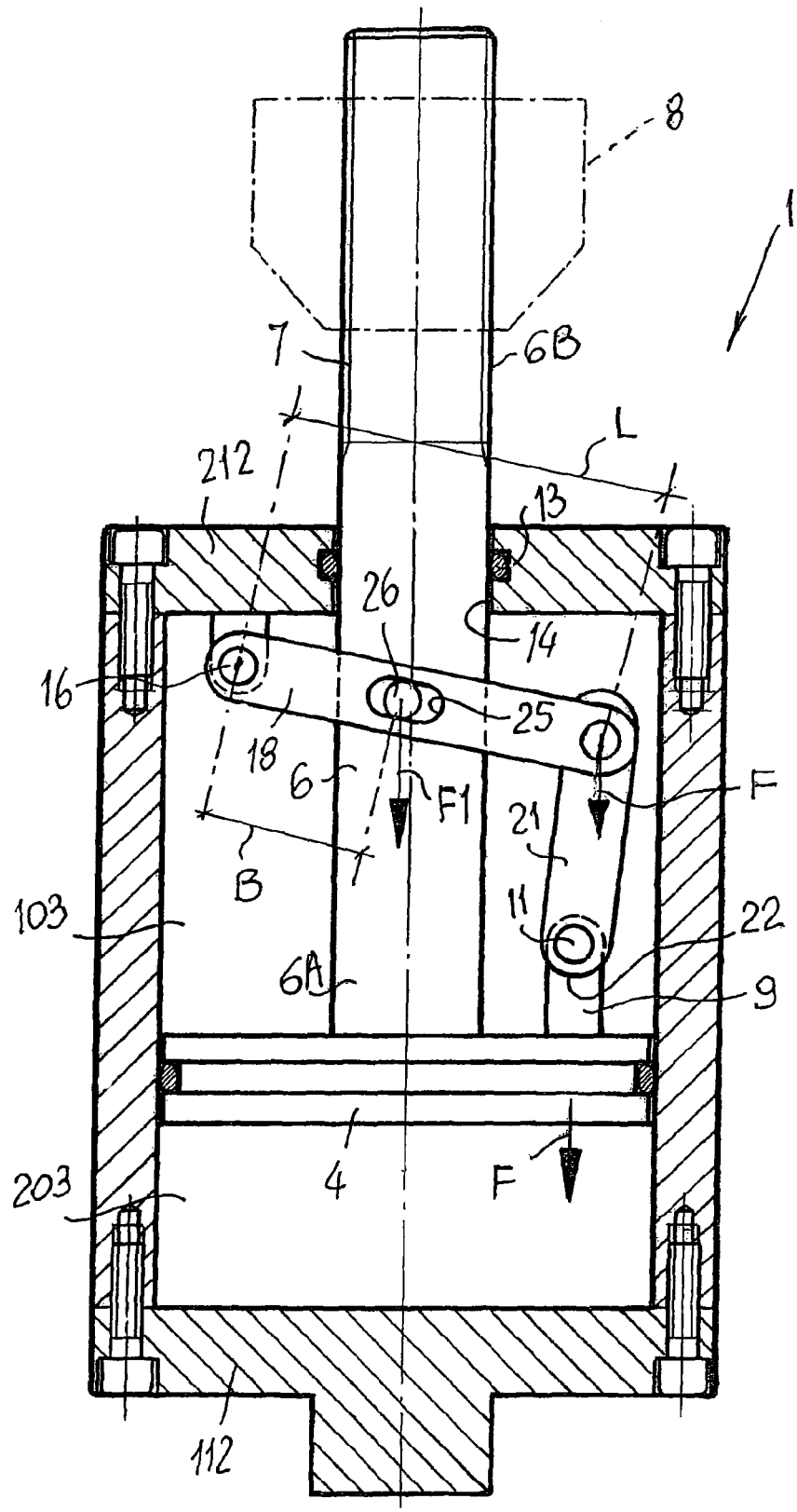
FIG. 2 is a very schematic view and in section of the actuator unit of FIG. 1.

With particular reference to FIGS. 1 and 2, by reference number 1 a whole actuator unit is indicated which comprises an external cylindrical body 2 inside which a sliding chamber 3 is defined.

Inside the sliding chamber 3 a piston 4 is mounted sliding which is operated with a fluid let into the sliding chamber 3 through an inlet port 5 and which divides the sliding chamber 3 in two adjacent portions identified by 103 and 203 respectively.

To the piston 4 is attached one connecting end 6A of the rod 6 extending coaxially to the external body 2 up to the outside of it, with one active end 6B.

On the latter is obtained a thread 7 designed to screw a conical body 8 in it, identified in FIG. 1 by a dotted line.

The piston 4 has on one side 4A an eccentric connecting bracket 9 that extends in relief from it and which has one end 10 with a hinge 11.

The external body 2 comprises a perimeter wall 12 that is closed on one side by a flange 112 arranged for connecting to the frame of a tire changing machine and, on the other side, by a removable cover 212 that, axially, has an aperture 14 to allow the rod 6 to pass through perpendicularly in contact with the seals 13 housed in the inside perimeter of the aperture 14.

This removable cover 212 has, on one side 212A facing the piston 4, another eccentric connecting bracket 15 extending from it also towards the piston 4, culminating with a hinge 16.

To the latter is hinged a first end 17 of a first connecting rod 18 which has an opposite second end 19.

As can be seen in the Figures, the first connecting rod 18 is arranged in a substantially crosswise position with respect to the rod 6 so the first end 17 is on one side of it while the second end 19 is on the opposite side.

In turn, to the second end 19 is hinged a third end 20 of a second connecting rod 21 which has a fourth end 22 hinged to the hinge 11 of the connecting bracket 9: therefore, the second connecting rod 21 is arranged substantially by the side of the rod 6 and joins the piston 4 to the first connecting rod 18.

Between the first connecting rod 18 and the rod 6 are arranged transmission means 23 that comprise at least one crosswise hole 24 obtained in the rod 6 and a slot 25 obtained in the first connecting rod 18 so as to be substantially aligned with the hole 24.

Between the latter and the slot 25 is inserted a transversal pin 26 which loosely connects the first connecting rod 18 to the rod 6 so as to transmit to the latter the movements of the piston 4 and to allow the rotation of the first connecting rod 18 around the hinge 16.

As can be seen in the Figures, between the hinge 16 and the transversal pin 26 a levering arm is defined indicated with "B" while the distance between the hinge 16, to which the first end 17 of the first connecting rod 18 is hinged and the hinged point of the second end 19 of the first connecting rod 18, is indicated with "L".

Figures 4, 5:
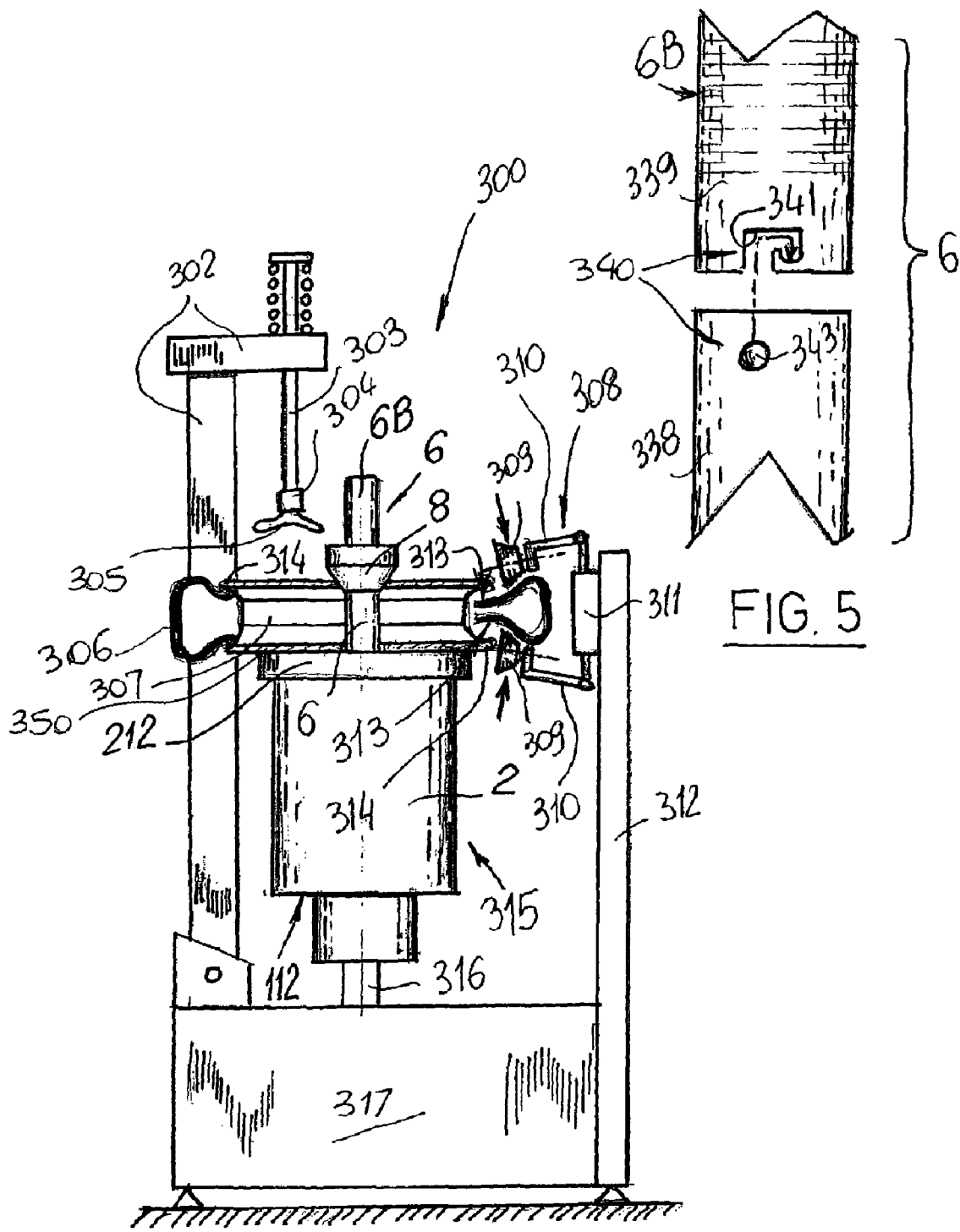
FIG. 4 is a view of an application example of the actuator unit of FIG. 1 on a tire changing machine.
FIG. 5 is a detailed view of the tire changing machine of FIG. 4.

With reference to the FIGS. 4 and 5, by 300 is indicated, an overall tire changing machine which has an operating arm 302 that carries, on an upper end, a post 303 which has a coupling 304 for connecting work tools 305, suitable for removing tires 306 from respective rims 307.

The tire changing machine 300 also has a bead breaking unit 308 that comprises a pair of rollers 309 held/mounted in such a way so they can turn freely from their little arms 310.

The latter are connected to an actuator 311 that is supported by an upright 312 and which allows the rollers 309 to move away from each other or close to each other so they can press the tire 306 on the beads 313.

The pressure on the beads 313 helps to detach them from the respective containment edges 314, with which the rim 307 is equipped.

To allow the bead breaking unit 308 to work on the beads 313 of a tire 306, the rim 307 is placed on a locking apparatus 315 that can be mounted on a first motorized and rotating shaft 316, with which the tire changing machine 300 is equipped and on which, normally, a vehicle wheel resting and locking platform is keyed but which, if needed, can be removed so the locking apparatus 315 can be mounted.

This latter comprises, as can be seen in detail in FIG. 1, the actuator unit 1 that operates the rod 6 on which the conical body 8 is screwed which, as illustrated in FIG. 4, will engage in the centre hole of a rim 307 of a wheel.

With reference to FIG. 5 it can be seen that the rod 6, in an embodiment of this invention, is made in two coaxial segments, indicated by 338 and 339 respectively, the latter coinciding substantially with the active end 6B of the rod 6.

The two coaxial segments can be connected together and released quickly by means of a connection 340 that comprises, for example, a bayonet coupling, i.e. between a shaped groove 341 which is obtained at the base of the segment 339 and a pin 343 that extends crosswise from at least one side of the segment 343, in proximity of its end, facing the shaped groove 341 and which will engage in the latter to allow to join the two segments 338 and 339 together in a removable manner to extend the rod 6.

The actuator unit 1 works in the following way: a fluid, e.g. compressed air, is let into the chamber 3 through the inlet port 5, occupying the portion 103 of this and acting on the side 4A of the piston 4.

The actuation force that develops, e.g. directed towards the flange 112, is transmitted through the connecting bracket 9 and the second connecting rod 21, to the second end 19 of the first connecting rod 18.

From this, which rotates in the direction of the flange 112, the actuation force "F" is, in turn, transmitted and amplified at a value "F1" to the rod 6 by means of the coupling between the slot 25 and the transversal pin 26.

The absolute value of the amplified actuation force "F1" is determined by the ratio between the length "L" of the first connecting rod 18 and the levering arm "B": the closer the length of the arm "B" is to the length "L" of the first connecting rod 18, the lower the amplification ratio will be between "F1" and "F" while, on the contrary, the shorter the levering arm "B" is in relation to the length "L" of the first connecting rod 18, the amplification of the actuation force "F1" will be proportionally greater in relation to the actuation force "F" generated by the piston 4.

Figure 3:
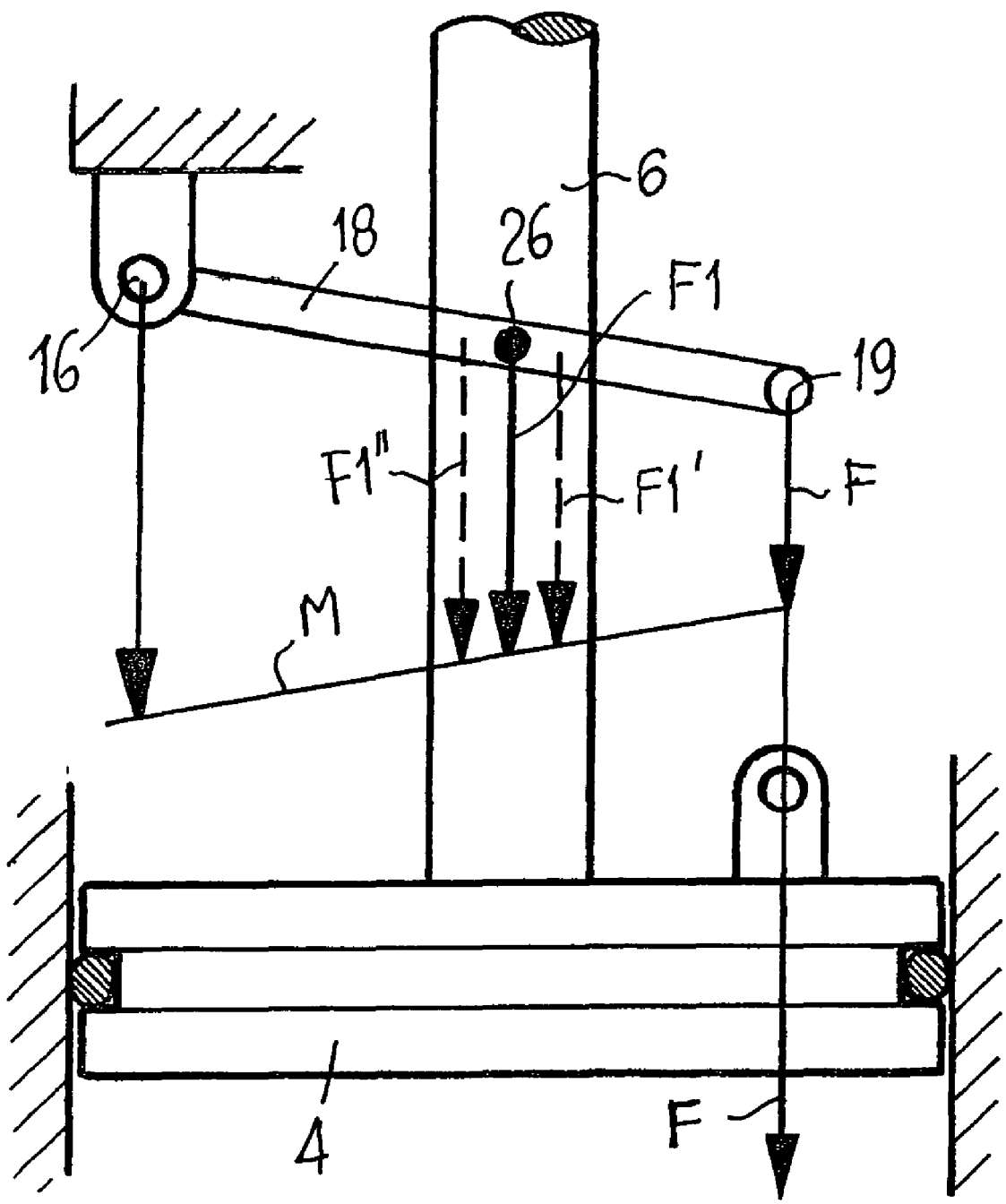
FIG. 3 is a view of the moment diagram relative to the actuator unit of FIGS. 1 and 2 in an actuation phase.

In FIG. 3 you can see the line that gives the momentum value, indicated with "M", and how the amplified actuation force "F1" has different values if its point of application is moved to the rod 6: these values diminish if the point of application is moved towards the second end 19 of the first connecting rod 18 or increase if the point of application is moved towards the hinge 16.

This same result can be obtained even if the fluid is let into the portion 203 of the sliding chamber 3 of the piston 4.

When the actuator unit 1 is mounted on the tire changing machine 300 the rotating work platform it is normally equipped with is removed beforehand and which is fixed on the first motorized rotating shaft 316 like, for example, by means of a motor unit located inside the casing 317 of the tire changing machine 300.

The actuator unit 1 is then mounted on the first shaft 316, replacing the work platform and becomes rotatingly integral with the latter.

The conical body 8 is unscrewed from the rod 6 and a wheel is placed against the upper side of the removable cover 212, passing the rod 6 through the centre hole of the rim 307.

The experts in this sector can also provide that the wheel does not rest directly on the cover 212 but on a resting flange 350 that, in this case, is placed above the cover 212 and fixed to it with bolts for example.

When the wheel is positioned correctly the operator screws the conical body 8 onto the thread 7 until the tapered portion of this conical body 8 engages in the centre hole of the rim 307.

At this point, the operator starts the actuator unit 1 that moves the rod 6 towards the wheel locking the rim 307 on the cover 212 due to the pressure exerted by the conical body 8.

The wheel is now locked on the actuator unit 1 and the operator can make it rotate by starting the first motorized rotating shaft 316.

Simultaneously the operator starts the bead breaking unit 308 so the little arms 310 converge together, operated by the actuator 311, and move the rollers 309 until they come into contact with the beads 313 of the tire 306 mounted on the rim 307.

The little arms 310 are pushed by the actuator 311 and the rollers 309 roll, simultaneously pressing on the beads 313 while the actuator unit 1 turns. This combined rotating and pressing action causes the beads 313 to come away, along the whole circumference of the tire 306, from the edges 314 of the rim 307, against which they normally rest during the use of the wheel and this then makes it possible to remove the tire 306 easily from the rim for either repair job or replacing.

When the tire 306 has been either repaired or replaced and put back on the rim 307, it is released by the actuator unit 1 that pushes the rod 6 outwards, disengaging a small section of the conical body 8 from the centre hole of the rim 307.

The operator can now unscrew the conical body 8 completely from the thread 7 and extract the latter from the rod 6, freeing the wheel completely which can now be put back on the vehicle of which it is a part.

Note that if the rod 6 is divided into the two segments 338 and 339, locking and unlocking phases of the rim 307 are substantially the same as those described previously.

However, to position a wheel quickly on the cover 212 it is possible to unhook the segment 339 from the segment 338.

This latter segment extends only a short way beyond the cover 212 and does not hinder the positioning of the wheel.

Subsequently, when the wheel is resting on the cover 212, the operator hooks the segment 339 engaging it with a bayonet coupling, on the segment 330 passing through the centre hole of the rim 307 and extending the rod 6 beyond the latter.

The conical body 8 can be left screwed for a short section on the segment 339 and in so doing the operator, after having hooked it on the segment 338, must screw the conical body 8 down for a very short section so it engages in the centre hole of the rim 307 and in so doing it takes much less time to lock the wheel on the actuator unit 1.

The same happens, in the opposite way, to remove the wheel.

The invention claimed is:

1. An actuator unit comprising:
   a hollow body defining a sliding chamber inside the hollow body;
   a piston mounted sliding inside said sliding chamber and adapted to provide an actuation force outside the sliding chamber, the piston being operated by a fluid fed from outside the piston;
   a member having one transmission end for the transmission of said actuation force outside said sliding chamber and one coupling end coupled to said piston; and
   amplification means interposed between said member and said piston to amplify said actuation force so as to obtain an amplified actuation force, said amplification means being disposed inside said sliding chamber and comprising:
      first connecting rod means having a first end hinged to a point of said hollow body and an opposite second end;
      second connecting rod means having a third end hinged to said second end and a fourth end hinged to said piston; and
      transmission means for the transmission of said amplified force placed between said first connecting rod means and said member and defining between said member and said point a levering arm,
   wherein said transmission means have a variable position with respect to said member, such to modify a length of said levering arm.

2. The actuator unit according to claim 1, wherein said point comprises a non-moving point.

3. The actuator unit according to claim 2, wherein said transmission means comprise:
   a crosswise hole obtained in said member;
   a slot obtained in said first connecting rod means so as to be substantially aligned with said hole; and
   a transversal pin inserted in said hole and engaging said slot so as to connect loosely said first connecting rod means to said member and to transmit to the member the movements of said piston, thus allowing the rotation of said first connecting rod means around said non-moving point.

4. The actuator unit according to claim 2, wherein said non-moving point comprises:
   a connecting bracket that extends integrally from a bottom face of a cover closing said sliding chamber; and
   a hinge to which said first end of said first connecting rod means is hinged having hinging an axis parallel to said bottom face of said cover.

5. The actuator unit according to claim 1, wherein said first connecting rod means have a length which is longer than said levering arm.

6. The actuator unit according to claim 1, wherein said amplified force is amplified depending on a ratio between lengths of said first connecting rod means and said levering arm.

7. The actuator unit according to claim 6, wherein said amplified force is amplified in direct proportion to the ratio between said lengths of said first connecting rod means and of said levering arm.

8. The actuator unit according to claim 1, wherein said member has a shape of a cylindrical rod.

9. The actuator unit according to claim 8, wherein said cylindrical rod comprises two segments which are adapted to be coaxially and removably connected one to the other.

10. The actuator unit according to claim 9, wherein said connection means comprise a bayonet coupling.

11. A tire changing machine comprising:
   a locking device configured to hold a wheel securely against a surface; and
   an actuator unit comprising:

a hollow body defining a sliding chamber inside the hollow body; and a piston mounted sliding inside said sliding chamber and adapted to provide an actuation force outside the sliding chamber, the piston being operated by a fluid fed from outside the piston;

a rod having one transmission end for the transmission of said actuation force outside said sliding chamber and one coupling end coupled to said piston; and amplification means interposed between said rod and said piston to amplify said actuation force so as to obtain an amplified actuation force, said amplification means being disposed inside said sliding chamber and comprising:

first connecting rod means having a first end hinged to a point of said hollow body and an opposite second end;

second connecting rod means having a third end hinged to said second end and a fourth end hinged to said piston; and transmission means for the transmission of said amplified force placed between said first connecting rod means and said rod and defining between said rod and said point a levering arm, wherein said transmission means have a variable position with respect to said rod, such to modify a length of said levering arm.

12. The tire changing machine according to claim 11, wherein said tire changing machine is configured to have said locking device and said actuator unit disposed on opposite sides of said wheel.

13. The tire changing machine according to claim 12, further comprising a resting flange interposed between said actuator and said locking device, said resting flange being configured to support said wheel.

* * * * *